United States Patent
Parikh et al.

(10) Patent No.: US 7,618,006 B2
(45) Date of Patent: Nov. 17, 2009

(54) RAM AIR INLETS FOR USE WITH AIRCRAFT ENVIRONMENTAL CONTROL SYSTEMS AND OTHER AIRCRAFT AND NON-AIRCRAFT SYSTEMS

(75) Inventors: Pradip G. Parikh, Renton, WA (US); E. Dale Hastings, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 11/599,245

(22) Filed: Nov. 13, 2006

(65) Prior Publication Data

US 2008/0135689 A1 Jun. 12, 2008

(51) Int. Cl.
*B64D 33/02* (2006.01)
(52) U.S. Cl. .................. 244/53 B; 137/15.1
(58) Field of Classification Search ............ 244/53 B, 244/118.5, 129.4, 209; 60/785; 137/15.1, 137/15.2
See application file for complete search history.

(56) References Cited

U.S. PATENT DOCUMENTS

| | | | |
|---|---|---|---|
| 3,265,331 A | 8/1966 | Miles | |
| 3,430,640 A | 3/1969 | Lennard | |
| 3,439,692 A * | 4/1969 | Pike | 137/15.2 |
| 4,307,743 A | 12/1981 | Dunn | |
| 4,569,494 A * | 2/1986 | Sakata | 244/199.1 |
| 4,836,473 A * | 6/1989 | Aulehla et al. | 244/130 |
| 5,967,169 A * | 10/1999 | Engel et al. | 137/15.1 |
| 6,349,899 B1 | 2/2002 | Ralston | |
| 6,901,737 B2 * | 6/2005 | Schnoor | 60/39.83 |
| 7,014,144 B2 | 3/2006 | Hein et al. | |
| 2002/0113167 A1 * | 8/2002 | Albero et al. | 244/53 R |

FOREIGN PATENT DOCUMENTS

EP 0358347 3/1990

OTHER PUBLICATIONS

International Search Report and Written Opinion; International Application No. PCT/US07/084556; Applicant: The Boeing Company; mailed Dec. 23, 2008, 14 pages.

* cited by examiner

*Primary Examiner*—Michael Carone
*Assistant Examiner*—Michael Kreiner
(74) *Attorney, Agent, or Firm*—Perkins Coie LLP

(57) ABSTRACT

Ram air inlets for use with aircraft environmental control systems and other aircraft and non-aircraft systems are described herein. In one embodiment, a ram air inlet configured in accordance with the present invention includes an inlet lip spaced apart from an inlet housing. An inlet door is moveably attached to the inlet housing, and includes a first surface portion, a second surface portion, and a transition region extending between the first and second surface portions. The first surface portion is moveably positioned at least approximately forward of the inlet lip. The second surface portion is fixed at an angle relative to the first surface portion, and is moveably positioned at least approximately aft of the inlet lip. The transition region is positioned at least approximately adjacent to the inlet lip to form an inlet opening therebetween. Movement of the inlet door in a first direction reduces the size of the inlet opening to thereby decrease the flow of ram air through the inlet. Conversely, movement of the inlet door in a second direction enlarges the inlet opening to increase the flow of ram air through the inlet.

25 Claims, 4 Drawing Sheets

RAM AIR INLETS FOR USE WITH AIRCRAFT ENVIRONMENTAL CONTROL SYSTEMS AND OTHER AIRCRAFT AND NON-AIRCRAFT SYSTEMS

TECHNICAL FIELD

The following disclosure relates generally to ram air inlets and, more particularly, to modulated ram air inlets for use with aircraft and other systems.

BACKGROUND

Ram air inlets have been used on commercial and military aircraft for a variety of different purposes. For example, ram air inlets have been used to provide air for propulsion and auxiliary power systems, as well as for various types of cooling systems. Ram air inlets have also been used to provide air for passenger cabin air conditioning systems and other onboard environmental control systems (ECSs).

FIG. 1A, for example, is a cross-sectional view of a portion of an aircraft 100 having an ECS ram air inlet 101 configured in accordance with the prior art. The ram air inlet 101 includes a conventional, 2-piece ram air inlet door 110 spaced apart from an inlet lip 108 to form a variable "throat" or inlet opening 124. The 2-piece inlet door 110 includes a forward door 112 and an aft door 114. The aft door 114 is set an angle relative to an inlet sidewall 109 to form a diffuser passage 132 leading to an ECS inlet duct 126. The ECS inlet duct 126 provides air to an ECS (not shown). A first hinge 116 pivotally connects a leading edge of the forward door 112 to an inlet housing 115. A second hinge 117 pivotally connects a leading edge of the aft door 114 to a trailing edge of the forward door 112. Tracks 118 (e.g., slider blocks) slidably support a trailing edge of the aft door 114. A door drive mechanism 122 (e.g., a 4-bar linkage) is operably coupled to the aft door 114 near the second hinge 117.

In operation, extension of the drive mechanism 122 moves the inlet door 110 toward the inlet lip 108, thereby restricting the inlet opening 124 and reducing the flow of ram air to the ECS inlet duct 126. The tracks 118 allow the trailing edge of the aft door 114 to slide forward as the two-piece inlet door 110 folds inwardly about the second hinge 117. Conversely, retraction of the drive mechanism 122 moves the inlet door 110 away from the inlet lip 108, thereby enlarging the inlet opening 124 and increasing the flow of ram air to the ECS inlet duct 126. The tracks 118 allow the trailing edge of the aft door 114 to slide aft as the two-piece inlet door 110 unfolds about the second hinge 117. A sliding seal 120 can be used to at least partially seal the gap between the trailing edge of the aft door 114 and the inlet housing 115 as the trailing edge moves fore and aft in the tracks 118. Although not shown in FIG. 1A, the inlet door 110 can include a number of additional components including, for example, a bellcrank, a torque tube, bearings, actuator mount, stiffener channel, etc.

The 2-piece inlet door illustrated in FIG. 1A is relatively complex. As a result, it can be relatively heavy and costly to manufacture. Furthermore, excessive dynamic loads on the door components, resulting from flow instability at the inlet opening 124, can cause excessive component wear which in turn leads to more frequent inspections and maintenance to prevent component failure. The flow instability relates to the geometry of the diffuser passage 132. For example, at throat openings less than about 35%, the 2-piece inlet door 110 operates in an unstable flow regime of the diffuser known as "transitory stall," as discussed in more detail below with reference to FIG. 1B.

FIG. 1B is a graph 128 illustrating the flow performance of the 2-piece door 110 of FIG. 1A. The parameter $2\alpha$ is measured along a vertical axis 130 of the graph 128, and the parameter $L/2b$ is measured along a horizontal axis 131. As shown in FIG. 1C, the variable "$\alpha$" relates to the angle formed between the aft door 114 and the sidewall 109. The variable "L" relates to the horizontal length of the diffuser passage 132, and the variable "b" relates to one-half the size of the ram air inlet opening 124. A first plot 134 represents a boundary between an attached flow regime (i.e., a stable flow regime) and a transitory stall regime (i.e., an unstable flow regime). A second plot 136 illustrates operating points of the ram air inlet 101 as a function of door position (measured as a percentage of full open).

As the graph 128 illustrates, the 2-piece inlet door 110 causes unstable flow in the diffuser passage 132 when the door is less than about 35% open. This instability can result in large pressure fluctuations, which in turn can impose excessive dynamic loads on the inlet components. The typical approach for dealing with this problem has been to strengthen the inlet components. The downside of this approach, however, is that it adds further complexity, cost and weight to the ram air inlets.

SUMMARY

The following summary is provided for the benefit of the reader only, and is not intended to limit the invention as set forth by the claims in any way.

Various embodiments of the invention are directed generally toward ram air inlets for use with aircraft ECSs and other systems. A ram air inlet configured in accordance with one aspect of the invention includes an inlet door moveably attached to an inlet housing. The inlet door includes a first surface portion and a second surface portion. The first surface portion is moveably positioned at least approximately forward of an inlet lip, and the second surface portion is moveably positioned at least proximately aft of the inlet lip. The second surface portion is fixed at an angle relative to the first surface portion, and is attached to the first surface portion by a transition region that extends between the first surface portion and the second surface portion. The transition region is moveably positioned at least approximately adjacent to the inlet lip to form a variable inlet opening therebetween. Movement of the inlet door in a first direction decreases the size of the inlet opening, and movement of the inlet door in a second direction opposite to the first direction increases the size of the inlet opening.

An aircraft system configured in accordance with another aspect of the invention includes a ram air inlet positioned at least proximate to an aerodynamic surface of an aircraft structure. The ram air inlet includes an inlet door moveably attached to an inlet housing opposite an inlet lip. The inlet door includes a forward surface region moveably positioned at least approximately forward of the inlet lip, and an aft surface region moveably positioned at least approximately aft of the inlet lip. The inlet door further includes a transition region that holds the forward surface region at an angle relative to the aft surface region. The transition region is movably positioned at least approximately adjacent to the inlet lip to form an inlet opening therebetween. Movement of the inlet door in a first direction decreases the size of the inlet opening, while movement of the inlet door in a second direction increases the size of the inlet opening.

A ram air system configured in accordance with a further aspect of the invention includes an inlet door positioned at least proximate to an inlet lip. The inlet door includes a first surface portion, a second surface portion fixed at an angle relative the first surface portion, and a transition region extending between the first and second surface portions. The ram air system further includes means for moveably positioning the first surface portion of the inlet door at least approximately forward of the inlet lip, and means for moveably positioning the second surface portion of the inlet door at least approximately aft of the inlet lip. In addition, the ram air system also includes means for moving the inlet door relative to the inlet lip to vary the size of an opening between the transition region of the inlet door and the inlet lip.

DETAILED DESCRIPTION

The following disclosure describes variable ram air inlets for use with aircraft environmental control systems (ECSs) and other aircraft and non-aircraft systems. Certain details are set forth in the following description and in FIGS. 2-5 to provide a thorough understanding of various embodiments of the invention. Other details describing well-known structures and systems often associated with aircraft, aircraft ram air inlets, and aircraft ECSs, for example, are not set forth in the following disclosure to avoid unnecessarily obscuring the description of various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. In addition, further embodiments of the invention can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 210 is first introduced and discussed with reference to FIG. 2.

Figure 2:
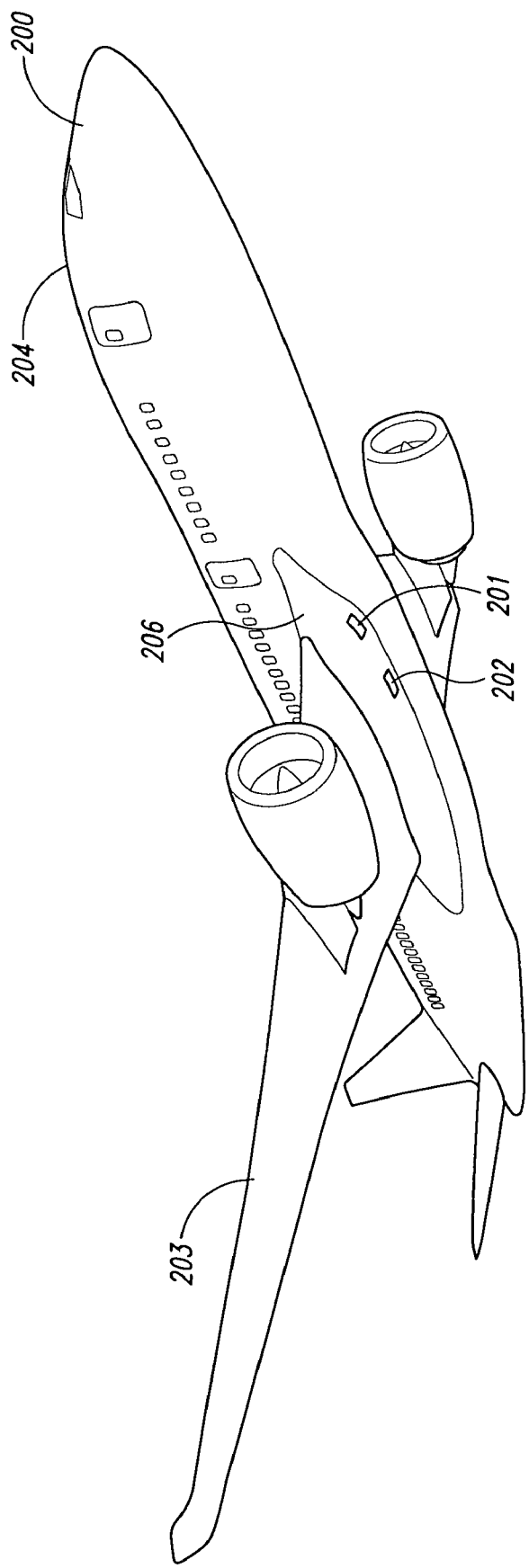
FIG. 2 is a bottom isometric view of an aircraft having a ram air inlet configured in accordance with an embodiment of the invention.

FIG. 2 is a bottom isometric view of an aircraft 200 having a ram air inlet 201 configured in accordance with an embodiment of the invention. The aircraft 200 includes a wing 203 extending outwardly from a fuselage 204. In this particular embodiment, the ram air inlet 201 is positioned on the underside of a wing-to-body fairing 206, and an associated ram air exhaust 202 is positioned aft of the ram air inlet 201. In other embodiments, the ram air inlet 201 and/or the ram air exhaust 202 can be located on other aerodynamic surfaces of the aircraft 200. For example, the ram air inlet 201 can be positioned in a positive pressure region of the fuselage 204, or in a region of the wing or empennage. Although only one ram air inlet is illustrated in FIG. 2, a similar ram air inlet and corresponding exhaust can be included on the other side of the aircraft 200. As described in more detail below, one purpose of the ram air inlet 201 can be to provide ram air to an aircraft ECS (not shown).

Figure 3A:
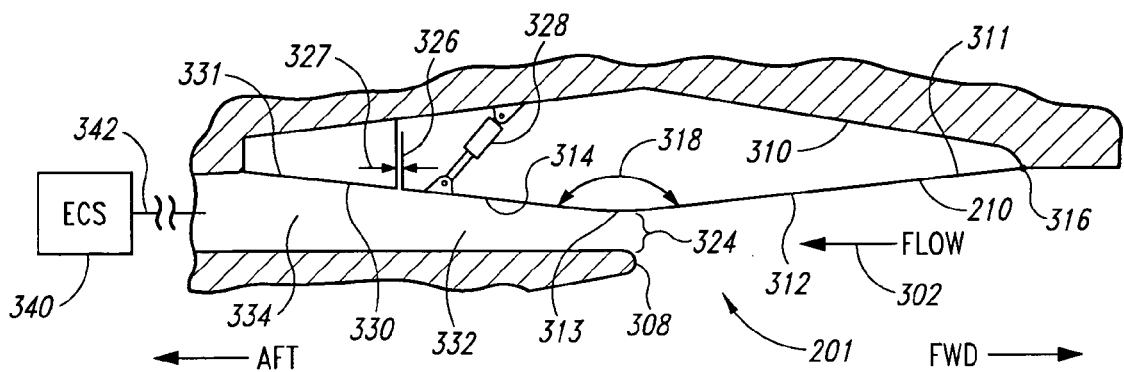
FIGS. 3A-3C are cross-sectional views of a portion of the aircraft of FIG. 2, illustrating a ram air inlet door configured in accordance with an embodiment of the invention.
Figure 3B:
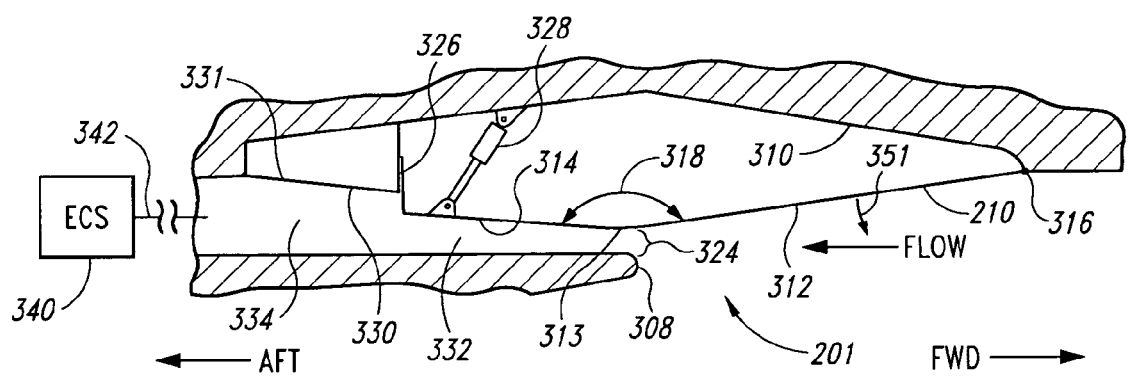
Figure 3C:
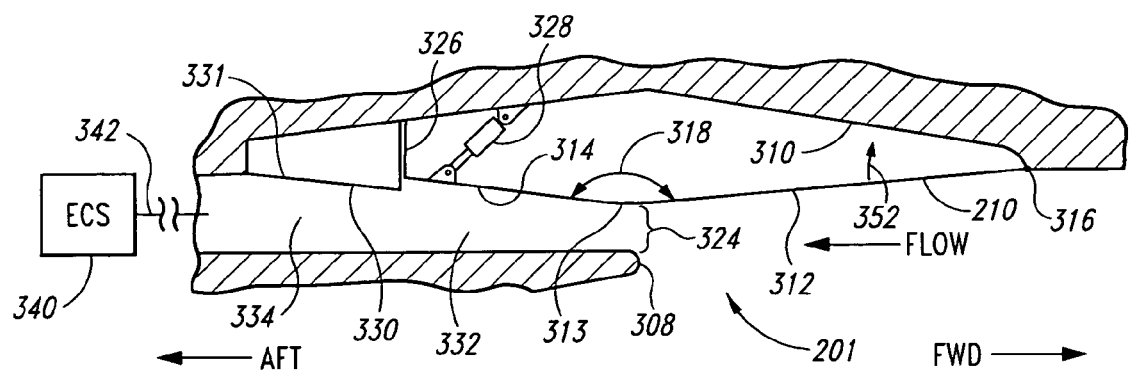

FIGS. 3A-3C are a series of cross-sectional side views of the ram air inlet 201 in various stages of operation. Referring first to FIG. 3A, the ram air inlet 201 includes an inlet housing 310 spaced apart from an inlet lip 308. A hinge 316 pivotally attaches a ram air inlet door 210 to the inlet housing 310. In this embodiment, the ram air inlet door 210 ("inlet door 210") is a "1-piece" door having a first surface portion 312 moveably positioned at least approximately forward or upstream of the inlet lip 308, a second surface portion 314 moveably positioned at least approximately aft or downstream of the inlet lip 308, and a transition region 313 spaced apart from the inlet lip 308 to form a "throat" or inlet opening 324 therebetween. The transition region 313 forms and angle 318 between the first surface portion 312 and the second surface portion 314. The angle 318 can be from about 130 degrees to about 178 degrees. For example, in one embodiment, the angle 318 can be from about 150 degrees to about 175 degrees. In another embodiment, the angle 318 can be from about 160 degrees to about 170 degrees. The inlet door 210 of this embodiment also includes a third surface portion 326 attached to an aft region of the second surface portion 314 and extending away from the second surface portion 314 toward the inlet housing 310.

Although the transition region 313 of the illustrated embodiment can at least approximate an edge where the first surface portion 312 and the second surface portion 314 meet, in other embodiments, the transition region 313 can include a more rounded or smoother transition region between these two surface portions. Thus, the transition region 313 will be understood to include sharp edges, rounded or curved transition regions, and/or other regions that can transition between the first surface portion 312 and the second surface portion 314. In addition, the term "inlet housing" is used herein for ease of reference only, and refers generally to the structure that receives and/or supports the inlet door 210. In this regard, the inlet housing 310 can include an enclosure but is not limited to an enclosure. Accordingly, in other embodiments, the inlet housing 310 can include other, more open arrangements of support structures.

In operation, ram air 302 flows through the inlet opening 324 and into a variable diffuser passage 332 formed by the second surface portion 314 and the opposing surface of the inlet lip 308. The ram air flows from the variable diffuser passage 332 into a fixed diffuser passage 334, before flowing through an inlet duct 342 to an aircraft ECS 340 (shown schematically). The fixed diffuser passage 334 is formed by a fixed diffuser 331 having a fixed diffuser surface 330. As described in greater detail below, in operation, the second surface portion 314 of the inlet door 210 is optionally positionable in alignment with the fixed diffuser surface 330, as shown in FIG. 3A.

An actuator 328 is operably coupled between the inlet housing 310 and the inlet door 210. In one embodiment, the actuator 328 can be electrically driven. In other embodiments, however, the actuator 328 can utilize other types of power including, for example, hydraulic, pneumatic, and/or mechanical power. In this particular embodiment, the actuator 328 is pivotally attached to the second surface portion 314 of the inlet door 210 for direct actuation of the inlet door 210. In other embodiments, however, the actuator 328, and/or one or more other actuators, can be operably coupled to the inlet door 210 in other positions to pivot the inlet door 210 about the hinge 316 during operation.

In operation, the actuator 328 pivots the inlet door 210 about the hinge 316 to change the size of the inlet opening 324 and alter the flow of ram air to the ECS 340. The angle 318 between the first surface portion 312 and the second surface portion 314 is selected so that the ram air flow through the inlet opening 324 remains stable, or at least generally stable, throughout the flow regime as the inlet door 210 is modulated. When the inlet door 210 is in the position illustrated in FIG. 3A (e.g., a 100% open position), the second surface portion 314 is aligned, or at least approximately aligned, with the fixed diffuser surface 330. As illustrated in FIG. 3B, the actuator 328 can pivot the inlet door 210 in a first direction 351 about the hinge 316 to reduce the size of the inlet opening 324 and, accordingly, reduce the flow of ram air to the ECS 340 (FIG. 3A). In this position, the third surface portion 326 of the inlet door 210 forms an aft facing surface or "air dam" that prevents high pressure air from the variable diffuser passage 332 from flowing back into the cavity between the inlet door 210 and the inlet housing 310. There is a relatively small (e.g., 0.05 inch to 0.10 inch) gap 327 (FIG. 3A) between the third surface portion 326 and the fixed diffuser 331 that prevents the pressure in the cavity between the inlet housing 310 and the inlet door 210 from dropping too low, thereby reducing static loads on the door during operation.

Figure 1A:
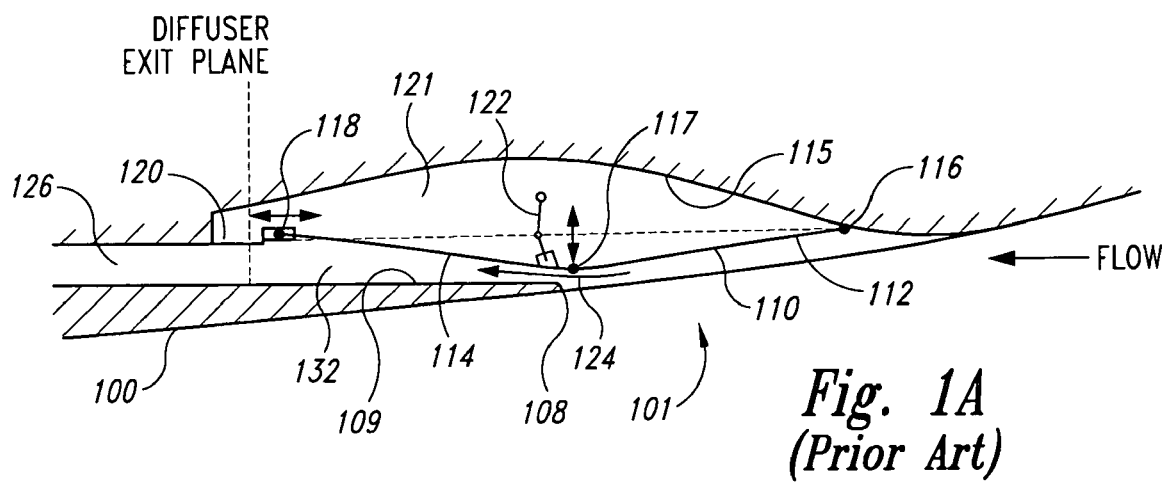
FIG. 1A is a cross-sectional view of a conventional ECS ram air inlet door configured in accordance with the prior art.

Referring next to FIG. 3C, the actuator 328 pivots the inlet door 210 in a second direction 352 about the hinge 316 to increase the inlet opening 324 and, accordingly, increase the flow of ram air to the ECS 340 (FIG. 3A). With increasing mass flow rates, however, the pressure recovery performance of the inlet door 210 may decrease. For example, at high mass flow rates approaching the choke limits of the inlet opening 324, the performance of the inlet door 210 may be somewhat less than the performance of the conventional 2-piece inlet door 110 (FIG. 1A) because the 2-piece door has a larger throat area. In practice, however, most ram air inlets are designed with a substantial margin to inlet choking limits, because ram air flow at the upper end of the flow range is typically limited by pressure losses in the ECS heat exchanger. As a result, the high mass flow rates where the recovery performance of the ram air inlet 201 drops off are often beyond the typical operating range. In addition, it may also be possible to delay the performance drop-off of the ram air inlet 201 to higher mass flow rates by increasing the throat area (i.e., the inlet opening 324) by approximately 10-15% beyond the point where the second surface portion 314 is aligned with the fixed diffuser 331. As shown in FIG. 3C, this results in a forward facing step at the fixed diffuser interface. Test data suggests that the recovery performance of the ram air inlet 201 with the inlet door 210 in this position is improved beyond that of the 100% open position illustrated in FIG. 3A when the ram air inlet 201 is operating at relatively high mass flow rates.

Figure 1B:
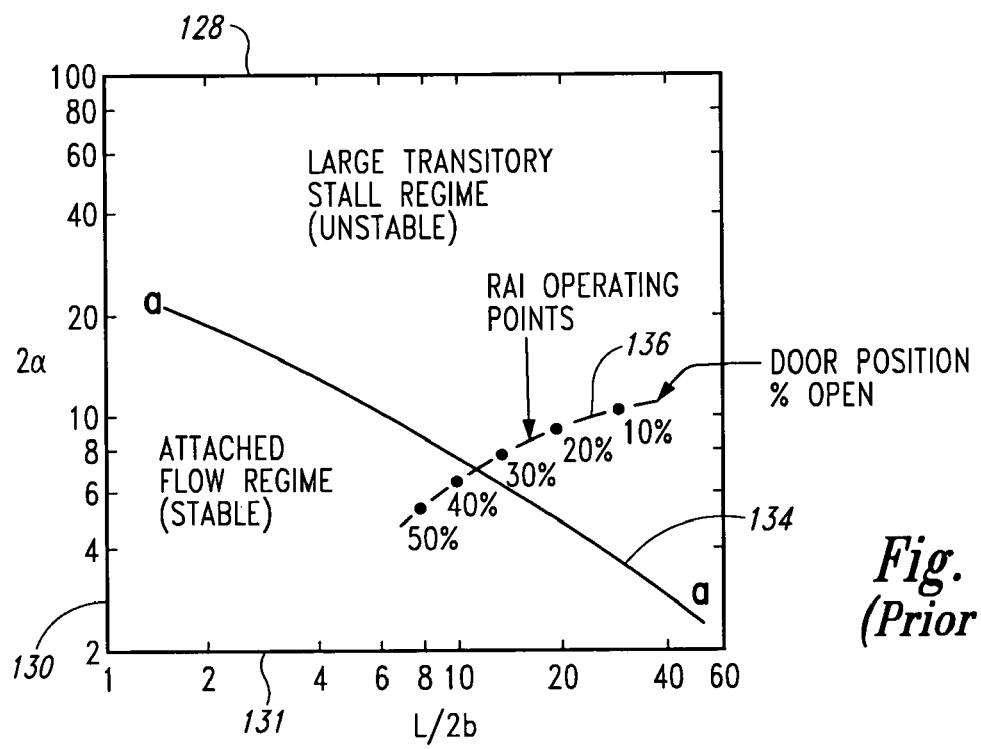
FIG. 1B is a graph illustrating the operational flow regimes of the ram air inlet door of FIG. 1A.
Figure 1C:
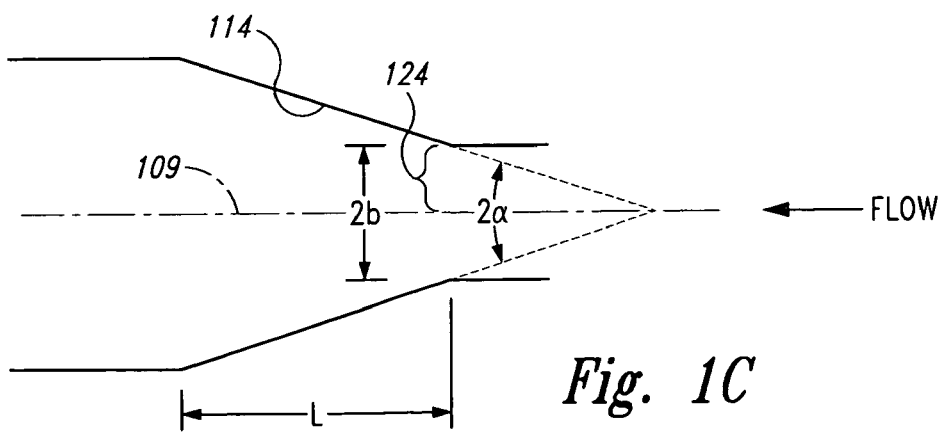
FIG. 1C is a graphical representation of the parameters used in the graph of FIG. 1B.
Figure 4:
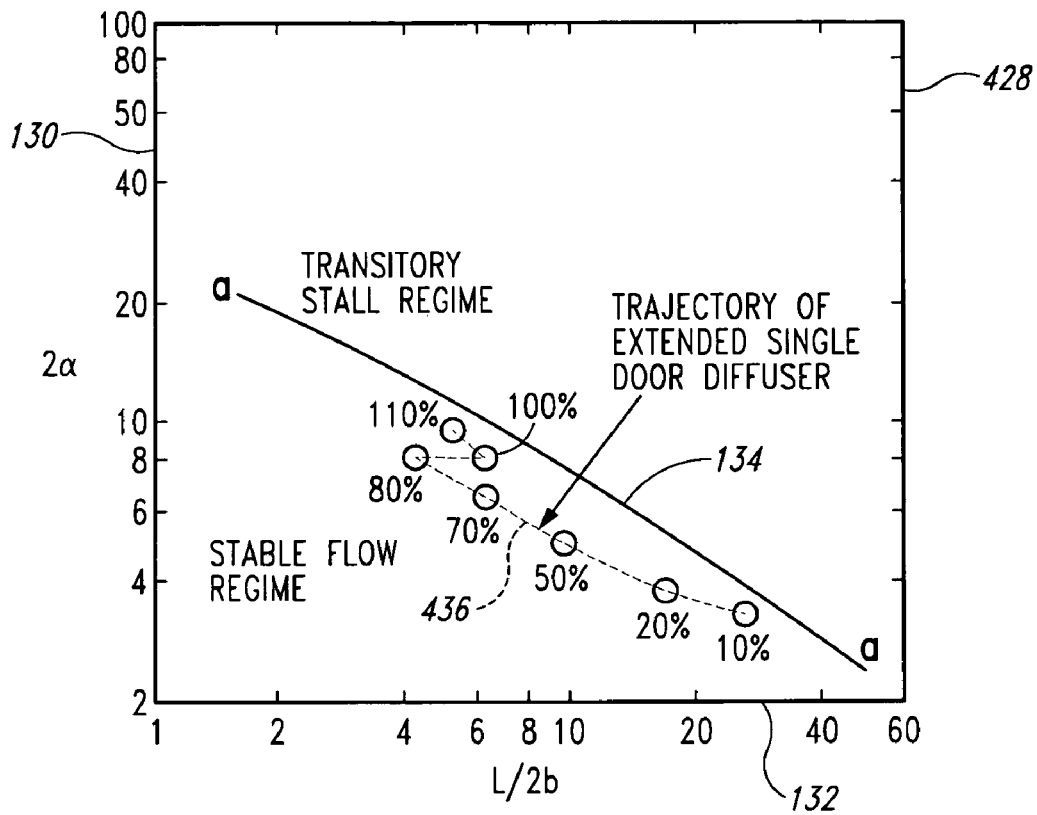
FIG. 4 is a graph illustrating the operational flow regimes of the ram air inlet door of FIGS. 3A-3C.

FIG. 4 illustrates a graph 428 which measures 2α along a vertical axis 130 and L/2b along a horizontal axis 132. As explained above with reference to FIG. 1C, the variable "α" relates to the angle between the second surface portion 314 and the opposing sidewall of the inlet lip 308, the variable "L" relates to the combined horizontal length of the variable diffuser passage 332 and the fixed diffuser passage 334, and the variable "b" relates to the size of the air inlet opening 324 (FIGS. 3A-3C). The plot 134 represents the boundary between stable and unstable flow regimes. The plot 436 illustrates operating points of the ram air inlet door 210 as a function of door position. More specifically, the plot 436 illustrates flow performance for door positions of about 10% open to about 110% open. As the graph 428 illustrates, the inlet 201 operates in the stable flow regime throughout door positions of 10% open to 110% open, in contrast to the conventional 2-piece door inlet 101 (FIG. 1A) which operates in the unstable flow regime in door positions less than about 35% open, as illustrated in FIG. 1B.

Figure 5:
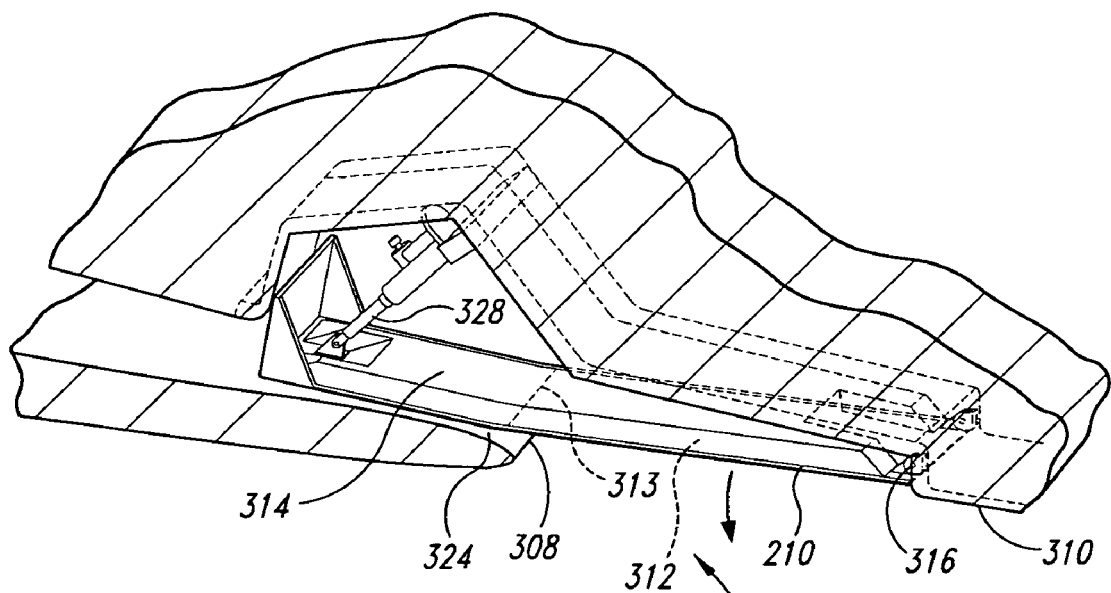
FIG. 5 is an isometric, cross-sectional view of the ram air inlet illustrated in FIGS. 3A-3C.

FIG. 5 is a cross-sectional isometric view of the ram air inlet 201 illustrating various features of the inlet door 210 in more detail. As this view illustrates, in one embodiment the hinge 316 can include two clevis-type fittings which pivotally connect a leading edge region of the inlet door 210 to the inlet housing 310. In other embodiments, however, other types of hinges and other types of rotating, pivoting, and/or translating mechanisms can be used to control the attitude and/or position of the inlet door 210 with respect to the inlet lip 308. This configuration eliminates the second hinge 117 and aft door sliding blocks used with conventional 2-piece inlet doors, such as the prior art inlet door 110 described above with reference to FIGS. 1A-1C.

In one aspect of this embodiment, a single actuator 328, such as a linear actuator, is attached to the inlet door 210 to control the position of the inlet door 210 relative to the inlet lip 308. An advantage of this embodiment is that the actuator 328 provides direct actuation of the inlet door 210 without the complexity of prior art systems which typically include, e.g., 4-bar linkages, special bearings, torque tubes, and bell cranks which can add considerable weight, complexity, and cost to the aircraft. The direct actuation method of the embodiments described herein eliminates many of these parts and can result in significant cost and weight savings, as well as reduced complexity and improved reliability. Although, in the illustrated embodiment, the inlet door 210 utilizes a single actuator, in other embodiments, 2 or more actuators can be used to control the position of the inlet door 210 relative to the inlet lip 308. Furthermore, such actuators can include mechanical, electrical, hydraulic, pneumatic, and/or other types of linear and/or non-linear drive mechanisms.

One advantage of embodiments of the ram air inlet door 210 described above is that at relatively low mass flow rates, such as those typical of a standard day at mid-cruise altitudes, the inlet door 210 shows improved pressure recovery performance as compared to the prior art 2-piece inlet door configuration described above with reference to FIGS. 1A-1C. The improvement in pressure recovery can translate into increased thrust recovery at the ram air exhaust 202 (FIG. 2). Another advantage of the embodiment illustrated in FIG. 5 is that the actuator 328 provides direct actuation of the inlet door 210. In contrast, conventional 2-piece inlet doors often require complex actuation systems (e.g., 4-bar linkage systems) with special bearings, torque tubes, and bell crank arrangements which can add a considerable amount of weight, complexity, and cost to the aircraft. The direct actuation method of the embodiments described herein eliminates many of these parts and can result in significant cost and weight savings, as well as reduced complexity and improved reliability.

To summarize, some of the benefits of various embodiments of the ram air inlet 201 described above include:

a) Elimination of center hinges, slider blocks, and/or other hardware typically associated with conventional 2-piece inlet doors through modulation of a single door to achieve throat area variation.

b) The contour of the ram air inlet door 210 incorporates a diffuser flow passage between the inlet throat and the aft door edge that remains in a stable flow regime as the door is modulated from its full open position to a nearly closed position, in contrast to prior art air inlet doors that operate in an unstable flow regime for door positions less than approximately 35% open.

c) The air inlet door 210 has the capability to move beyond the 100% open position (e.g., see FIG. 3C) to improve pressure recovery performance at high mass flow rates.

d) The air dam formed by the third surface portion 326 at the trailing edge region of the air inlet door 210 can reduce static and dynamic loads on the inlet door 210 during operation.

e) The direct actuation of the inlet door 210 eliminates complex actuation mechanisms such as a 4-bar linkages, bearings, torque tubes, bell cranks, and other hardware often associated with conventional 2-piece air inlet doors.

From the foregoing, it will be appreciated that specific embodiments of the invention have been described herein for purposes of illustration, but that various modifications may be made without deviating from the spirit or scope of the various embodiments of the invention. For example, although aspects of the invention have been described above in the context of ram air inlets for use with aircraft ECSs, in other embodiments, ram air inlets configured in accordance with aspects of the present invention can be used to provide air to other types of aircraft systems, such as aircraft propulsion, auxiliary power, and/or cooling systems. In still further embodiments, ram air inlets configured in accordance with aspects of the present invention can be used with other vehicles including, for example, rockets, missiles, and high-speed land or sea vehicles. In addition, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A ram air inlet comprising:
   an inlet lip portion;
   an inlet sidewall portion positioned downstream of the inlet lip portion;
   an inlet housing portion spaced apart from the inlet lip portion, and
   an inlet door movably positioned at least approximately adjacent to the inlet lip portion to form a variable inlet opening therebetween, the inlet door including:
      a first surface portion positioned upstream of the inlet lip portion, wherein the first surface portion includes a forward edge region pivotally attached to the inlet housing portion, and wherein the forward edge region is spaced apart from the inlet lip portion by a first distance; and
      a second surface portion fixed at an angle relative to the first surface portion and positioned downstream of the inlet lip portion opposite the inlet sidewall portion, wherein the second surface portion includes an aft edge region spaced apart from the forward edge region by a second distance that is greater than the first distance, wherein movement of the inlet door in a first direction reduces the inlet opening to decrease a flow of ram air through the inlet opening, and wherein movement of the inlet door in a second direction enlarges the inlet opening to increase the flow of ram air through the inlet opening.

2. The ram air inlet of claim 1 wherein the inlet door further includes a transition region extending between the first surface portion and the second surface portion, wherein the transition region is movably positioned at least approximately adjacent to the inlet lip portion to form the variable inlet opening therebetween.

3. The ram air inlet of claim 2 wherein rotation of the inlet door in the first direction reduces the inlet opening, and wherein rotation of the inlet door in the second direction enlarges the inlet opening.

4. The ram air inlet of claim 2, further comprising a hinge pivotally attaching the forward edge region of the first surface portion to the inlet housing portion, wherein rotation of the inlet door in the first direction about the hinge reduces the inlet opening, and wherein rotation of the inlet door in the second direction about the hinge enlarges the inlet opening.

5. The ram air inlet of claim 2, further comprising:
   a hinge pivotally attaching the forward edge region of the first surface portion to the inlet housing portion; and
   an actuator operably coupled to the inlet door, wherein operation of the actuator in a first way causes the inlet door to rotate about the hinge in the first direction and reduce the inlet opening, and wherein operation of the actuator in a second way causes the inlet door to rotate about the hinge in the second direction and enlarge the inlet opening.

6. The ram air inlet of claim 2 wherein the second surface portion of the inlet door at least partially forms a variable diffusing passage in flow communication with the inlet opening, and wherein the ram air inlet further comprises:
   a hinge pivotally attaching the forward edge region of the first surface portion to the inlet housing portion; and
   a fixed diffusing passage having a fixed surface portion positioned downstream of the variable diffusing passage, wherein the second surface portion of the inlet door is optionally positionable in alignment with the fixed surface portion of the fixed diffusing passage, wherein rotation of the inlet door in the first direction about the hinge decreases the size of the variable diffusing passage, and wherein rotation of the inlet door in the second direction about the hinge increases the size of the variable diffusing passage.

7. The ram air inlet of claim 1 wherein the first surface portion is at least generally planar and the second surface portion is at least generally planar, and wherein the second surface portion is fixed at an angle from about 130 degrees to about 178 degrees relative to the first surface portion.

8. The ram air inlet of claim 1 wherein the second surface portion of the inlet door at least partially forms a variable diffusing passage in flow communication with the inlet opening.

9. The ram air inlet of claim 1 wherein the second surface portion of the inlet door at least partially forms a variable diffusing passage in flow communication with the inlet opening, wherein the ram air inlet further comprises a fixed diffusing passage positioned adjacent to the variable diffusing passage.

10. The ram air inlet of claim 1 wherein the second surface portion of the inlet door at least partially forms a variable diffusing passage in flow communication with the inlet opening, and wherein the ram air inlet further comprises a fixed diffusing passage having a fixed surface portion positioned downstream of the variable diffusing passage at an acute angle relative to the inlet sidewall portion, wherein the second surface portion of the inlet door is optionally positionable in alignment with the fixed surface portion of the fixed diffusing passage.

11. The ram air inlet of claim 1 wherein the second surface portion of the inlet door at least partially forms a variable diffusing passage in flow communication with the inlet opening, wherein the inlet door further includes a third surface portion fixedly attached to the aft edge region of the second surface portion, the third surface portion extending away from the variable diffusing passage, and wherein the ram air inlet further comprises:

a fixed diffusing passage having a fixed surface portion positioned downstream of the variable diffusing passage at an angle relative to the inlet sidewall portion, wherein the second surface portion of the inlet door is optionally positionable in alignment with the fixed surface portion of the fixed diffusing passage, wherein movement of the second surface portion away from the fixed surface portion in the first direction causes the third surface portion of the inlet door to form an aft-facing step between the variable diffusing passage and the fixed diffusing passage.

12. The ram air inlet of claim 1, further comprising an actuator operably coupled to the inlet door, wherein actuator is configured to move the inlet door in the first and second directions by direct actuation.

13. The ram air inlet of claim 1 wherein the second surface portion of the inlet door at least partially forms a variable diffusing passage in flow communication with the inlet opening, and wherein the ram air inlet further comprises:

a fixed diffusing passage having:
a fixed surface portion positioned downstream of the variable diffusing passage; and
a forward surface portion extending away from the fixed surface portion toward the inlet housing portion;
wherein the second surface portion of the inlet door is optionally positionable in alignment with the fixed surface portion of the fixed diffusing passage; and
wherein movement of the second surface portion away from the fixed surface portion in the second direction causes the forward surface portion of the fixed diffusing passage to form a forward-facing step between the variable diffusing passage and the fixed diffusing passage.

14. An aircraft system, comprising:
an aircraft structure having an aerodynamic surface; and
a ram air inlet positioned at least proximate to the aerodynamic surface, the ram air inlet including:
an inlet housing;
an inlet lip spaced apart from the inlet housing; and
an inlet door movably attached to the inlet housing, the inlet door including:
a forward surface portion movably positioned at least approximately forward of the inlet lip, wherein the forward surface portion includes a forward edge region pivotally attached to the inlet housing and spaced apart from the inlet lip by a first distance;
an aft surface portion fixed at an angle relative to the forward surface portion, wherein the aft surface portion includes an aft edge region movably positioned aft of the inlet lip and spaced apart from the forward edge region by a second distance that is greater than the first distance; and
a transition region extending between the forward surface portion and the aft surface portion, wherein the transition region is movably positioned at least approximately adjacent to the inlet lip to form an inlet opening therebetween, wherein movement of the inlet door in a first direction decreases the size of the inlet opening, and wherein movement of the inlet door in a second direction increases the size of the inlet opening.

15. The aircraft system of claim 14, further comprising:
a fuselage; and
a wing extending outwardly from the fuselage, wherein the aircraft structure is a wing-to-fuselage fairing and the aerodynamic surface is a fairing surface that forms a relatively smooth transition between the wing and the fuselage.

16. The aircraft system of claim 14 wherein the aircraft structure is a fuselage and the aerodynamic surface includes at least a portion of an external surface of the fuselage.

17. The aircraft system of claim 14 wherein the aerodynamic surface includes at least a portion of an airfoil surface.

18. The aircraft system of claim 14, further comprising an environmental control system positioned to receive ram air from the ram air inlet.

19. The aircraft system of claim 14 wherein the ram air inlet further comprises a fixed diffuser surface positioned aft of the aft surface portion of the inlet door, wherein the aft surface portion of the inlet door is optionally positionable in alignment with the fixed diffuser surface during operation of the inlet door.

20. The aircraft system of claim 14 wherein the ram air inlet further comprises:
an inlet sidewall positioned downstream of the inlet lip; and
a fixed diffuser surface positioned aft of the aft surface portion of the inlet door at an acute angle relative to the inlet sidewall, wherein the aft surface portion of the inlet door is optionally positionable in alignment with the fixed diffuser surface during operation of the inlet door.

21. The aircraft system of claim 14 wherein the aft surface portion of the inlet door is flat, and wherein the ram air inlet further comprises:
a flat inlet sidewall positioned downstream of the inlet lip; and
a flat fixed diffuser surface positioned aft of the aft surface portion of the inlet door at an acute angle relative to the inlet sidewall, wherein the aft surface portion of the inlet door is optionally positionable in a coplanar relationship with the fixed diffuser surface during operation of the inlet door.

22. A ram air system for providing air to a portion of an aircraft, the ram air system comprising:
an inlet lip portion;
an inlet door positioned at least proximate to the inlet lip portion, the inlet door including:
a first surface portion having a forward edge region;
an second surface portion fixed at an angle relative to the first surface portion, the second surface portion having an aft edge region; and
a transition region extending between the first surface portion and the second surface portion;
means for movably positioning the first surface portion of the inlet door at least approximately forward of the inlet lip portion, whereby the forward edge region is spaced apart from the inlet lip portion by a first distance;
means for movably positioning the second surface portion of the inlet door at least approximately aft of the inlet lip portion, whereby the aft edge region is spaced apart from the forward edge region by a second distance that is greater than the first distance; and
means for moving the inlet door relative to the inlet lip portion to vary the size of an inlet opening between the transition region of the inlet door and the inlet lip portion.

23. The ram air system of claim 22 wherein the second surface portion of the inlet door at least partially forms a variable diffusing passage in flow communication with the inlet opening, and wherein the ram air system further comprises:

an inlet housing portion spaced apart from the inlet lip portion, wherein the means for movably positioning the first surface portion of the inlet door include means for movably attaching the inlet door to the inlet housing portion;

means for flowing ram air through the variable diffusing passage; and while flowing ram air through the variable diffusing passage, means for preventing the ram air flowing through the variable diffusing passage from flowing into a space between the inlet housing portion and the inlet door.

24. The ram air system of claim 22 wherein the means for movably positioning the first surface portion of the inlet door at least approximately forward of the inlet lip portion include hinge means for pivotally connecting the forward edge region of the first surface portion to a housing.

25. The ram air system of claim 22 wherein the means for moving the inlet door relative to the inlet lip portion include a linear actuator.

* * * * *

UNITED STATES PATENT AND TRADEMARK OFFICE
CERTIFICATE OF CORRECTION

PATENT NO. : 7,618,006 B2  Page 1 of 1
APPLICATION NO. : 11/599245
DATED : November 17, 2009
INVENTOR(S) : Parikh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this

Nineteenth Day of October, 2010

David J. Kappos
*Director of the United States Patent and Trademark Office*